(12) United States Patent
Okamoto et al.

(10) Patent No.: US 10,280,954 B2
(45) Date of Patent: May 7, 2019

(54) CLIP

(71) Applicants: NIFCO INC., Yokosuka-shi (Kanagawa) (JP); TOYOTA BOSHOKU KABUSHIKI KAISHA, Kariya-shi (Aichi) (JP)

(72) Inventors: Daisuke Okamoto, Yokosuka (JP); Masato Arashi, Kariya (JP); Shunsuke Tanaka, Toyota (JP); Masahiro Sano, Toyota (JP)

(73) Assignees: NIFCO INC. (JP); TOYOTA BOSHOKU KABUSHIKI KAISHA (JP)

( * ) Notice: Subject to any disclaimer, the term of this patent is extended or adjusted under 35 U.S.C. 154(b) by 0 days.

(21) Appl. No.: 14/960,830

(22) Filed: Dec. 7, 2015

(65) Prior Publication Data

US 2016/0169417 A1    Jun. 16, 2016

(30) Foreign Application Priority Data

Dec. 10, 2014  (JP) .................................. 2014-250383

(51) Int. Cl.
*F16B 2/10* (2006.01)
*B60N 2/72* (2006.01)
(Continued)

(52) U.S. Cl.
CPC .............. *F16B 2/10* (2013.01); *B60N 2/7094* (2013.01); *B60N 2/72* (2013.01); *F16B 21/086* (2013.01)

(58) Field of Classification Search
CPC . F16L 3/13; F16L 3/127; F16L 55/035; F16B 2/10; F16B 21/086; B60N 2/72; B60N 2/7094
(Continued)

(56) References Cited

U.S. PATENT DOCUMENTS

| 2,397,680 | A | * | 4/1946 | Morehouse | F16L 3/127 248/72 |
| 3,126,183 | A | * | 3/1964 | Hopkins | F16L 3/12 174/164 |
| 3,157,377 | A | * | 11/1964 | Orenick | F16L 3/127 174/164 |

(Continued)

FOREIGN PATENT DOCUMENTS

| JP | 10019168 A * | 1/1998 | ................ F16L 3/08 |
| JP | H11-257318 | 9/1999 | |

(Continued)

OTHER PUBLICATIONS

English Translation of Japanese Office Action for Japanese Patent Application No. 2014-250383 dated Aug. 15, 2017.

*Primary Examiner* — Kimberly T Wood
(74) *Attorney, Agent, or Firm* — Thomas|Horstemeyer, LLP (57) ABSTRACT

In a clip, first and second attachment portions are coupled by a coupling portion in an open state in which a seatback spring is able to pass between the first and second attachment portions in the radial direction of the seatback spring. The first and second attachment portions swing in mutually engaging directions. The first attachment portion is formed with a first placement portion, and the second attachment portion is formed with a second placement portion. The seatback spring can accordingly be placed between the coupling portion and either the first placement portion or the second placement portion. In this placed state, the seatback spring is retained in the clip by engaging an engagement claw of the first attachment portion with a peripheral edge portion of an engagement hole of the second attachment portion, enabling fixing to an attachment portion of a lower frame.

11 Claims, 6 Drawing Sheets

(51) Int. Cl.
 *B60N 2/70* (2006.01)
 *F16B 21/08* (2006.01)

(58) Field of Classification Search
 USPC ............... 248/71, 58, 61, 63, 73, 74.2, 68.1
 See application file for complete search history.

(56) References Cited

U.S. PATENT DOCUMENTS

| | | | | | |
|---|---|---|---|---|---|
| 3,345,706 | A | * | 10/1967 | Stokes | F16B 5/0685 24/458 |
| 4,334,659 | A | * | 6/1982 | Yuda | F16B 21/086 24/17 AP |
| 4,406,557 | A | * | 9/1983 | Suzuki | E05B 79/12 403/187 |
| 4,509,710 | A | * | 4/1985 | Cooper | F16L 3/2235 24/16 PB |
| 4,602,760 | A | | 7/1986 | Tiefenbach et al. | |
| 5,762,397 | A | * | 6/1998 | Venuto | B60N 2/667 297/284.4 |
| 5,845,883 | A | * | 12/1998 | Meyer | F16B 19/004 248/222.12 |
| 5,906,342 | A | * | 5/1999 | Kraus | F16L 3/127 24/16 PB |
| 6,747,209 | B2 | * | 6/2004 | Uchida | B60R 16/0215 174/135 |
| 7,562,420 | B2 | * | 7/2009 | Kato | F16B 5/0664 24/297 |
| 8,403,272 | B2 | * | 3/2013 | Ohno | F16L 3/127 174/164 |
| 8,950,713 | B2 | * | 2/2015 | Ogasawara | B60R 11/00 24/16 PB |
| 2004/0046088 | A1 | * | 3/2004 | Uchida | H02G 3/32 248/74.1 |
| 2010/0084520 | A1 | * | 4/2010 | Ohno | F16L 3/127 248/74.1 |

FOREIGN PATENT DOCUMENTS

| | | |
|---|---|---|
| JP | 2006-112546 A | 4/2006 |
| JP | 2011-36030 A | 2/2011 |

* cited by examiner

CLIP

CROSS-REFERENCE TO RELATED APPLICATION

This application claims priority under 35 USC 119 from Japanese Patent Application No. 2014-250383 filed Dec. 10, 2014, the disclosure of which is incorporated by reference herein.

BACKGROUND

Field of the Invention

The present invention relates to a clip for retaining a retained member such as a wire at an attached-to member such as a frame.

Related Art

For example, a clip described in U.S. Pat. No. 5,762,397 is a known clip of this type. This clip includes an attachment portion for attaching a retained member such as a wire, and a pair of leg portions extending from the attachment portion. The retained member such as a wire is pushed into the attachment portion, and the pair of leg portions are inserted into a hole formed in an attached-to member such as a frame.

However, in the clip of U.S. Pat. No. 5,762,397, when a hard retained member such as a metal wire is pushed into the attachment portion, it is necessary to push the pair of leg portions apart in a direction away from each other to pass the retained member between the pair of leg portions. The workability when attaching the retained member is therefore poor.

SUMMARY

In consideration of the above circumstances, a clip is obtained that is capable of improving workability when attaching a retained member.

A clip of a first aspect includes: a first attachment portion that is capable of being inserted into an opening portion formed at an attached-to member; a second attachment portion that is capable of being inserted into the opening portion in a state in which the first attachment portion and the second attachment portion are engaged; a coupling portion that couples the first attachment portion and the second attachment portion in an open state in which an elongated retained member is able to pass between the first attachment portion and the second attachment portion, and that enables the first attachment portion and the second attachment portion to swing in mutually engaging directions; a placement portion that is formed at at least one of the first attachment portion or the second attachment portion, and that enables the retained member to be placed between the coupling portion and the at least one of the first attachment portion or the second attachment portion; an engagement portion that is formed at one of the first attachment portion or the second attachment portion; and an engaged-with portion that is formed at the other of the first attachment portion or the second attachment portion, and that is capable of engaging with the engagement portion; wherein the placement portion and the coupling portion hold therebetween the retained member in a state in which the first attachment portion and the second attachment portion are engaged with each other by the engagement portion and the engaged-with portion.

In the clip of the first aspect, in an unused state of the clip, the first attachment portion and the second attachment portion are coupled together by the coupling portion in an open state in which the elongated retained member is able to pass between the first attachment portion and the second attachment portion. In this state, the retained member is placed between the coupling member and the placement portion(s) formed at at least one of the first attachment portion or the second attachment portion (one of the first attachment portion or the second attachment portion, or both of the first attachment portion and the second attachment portion). Next, with the coupling portion acting as a hinge, the first attachment portion and the second attachment portion swing in mutually engaging directions, and the engagement portion formed at one of the first attachment portion or the second attachment portion is made to engage with the engaged-with portion formed at the other of the first attachment portion or the second attachment portion. This thereby enables the retained member to be hold therebetween by the placement portion(s) and the coupling portion. Next, the first attachment portion and the second attachment portion in a mutually engaged locked state are inserted into the opening. There is thereby no need to push the first attachment portion and the second attachment portion apart in a direction away from each other, and the retained member can be placed between the placement portion(s) and the coupling portion, when retaining the retained member in the clip. As a result, the workability when attaching the retained member is improved.

In a clip of a second aspect, the retained member is a line-shaped member; and the clip further comprises elastic leg portions that are respectively formed at the first attachment portion and the second attachment portion, and that are capable of elastically engaging with a peripheral edge portion of the opening portion.

In the clip of the second aspect, when the first attachment portion and the second attachment portion are inserted into the opening portion, the elastic leg portions formed at the first attachment portion and the second attachment portion engage elastically with the peripheral edge portion of the opening. The first attachment member and the second attachment member are thereby attached to the opening portion formed at the attached-to member.

A third aspect is the clip of either the first aspect or the second aspect, wherein the placement portion is formed at both the first attachment portion and the second attachment portion.

In the clip of the third aspect, when retaining the retained member in the clip, the retained member can be placed between the coupling portion and the placement portion that is easier to work with out of the placement portion formed at the first attachment portion and the placement portion formed at the second attachment portion. This thereby further improves the workability when attaching the retained member.

A fourth aspect is the clip of any one of the first aspect to the third aspect, wherein a length of the placement portion along a direction of an axial line of the retained member is longer than a length of the coupling portion along the direction of the axial line of the retained member.

In the clip of the fourth aspect, when the retained member is retained in the clip, the retained member is supported by the placement portion that has a longer length along the direction of the axial line than that of the coupling portion. The retained member accordingly can be retained in a stable state, and the workability when attaching the retained member is further improved.

A fifth aspect is the clip of any one of the first aspect to the fourth aspect, wherein the engagement portion is an engagement claw that is capable of elastic deformation, and the engaged-with portion is an engagement hole that the engagement claw is capable of engaging with.

In the clip of the fifth aspect, a clicking sensation can be obtained due to the engagement claw formed at either the first attachment portion or the second attachment portion engaging with the peripheral edge portion of the engagement hole formed at the other out of either the first attachment portion or the second attachment portion. The engagement of the engagement claw with the peripheral edge portion of the engagement hole can accordingly be confirmed, thereby enabling engagement to be performed more reliably. Moreover, the retained member does not come apart from the clip during the operation due to the engagement claw engaging with the peripheral edge portion of the engagement hole to attain a locked state. The workability when attaching the retained member is accordingly further improved.

Due to the above configuration, the clip of the first aspect enables an improvement in the workability when attaching the retained member.

Due to the above configuration, the clip of the second aspect enables a further improvement in the workability when attaching the retained member.

Due to the above configuration, the clip of the third aspect enables a further improvement in the workability when attaching the retained member.

Due to the above configuration, the clip of the fourth aspect enables a further improvement in the workability when attaching the retained member.

Due to the above configuration, the clip of the fifth aspect enables a further improvement in the workability when attaching the retained member.

BRIEF DESCRIPTION OF THE DRAWINGS

Exemplary embodiment will be described in detail with reference to the following figures, wherein.

DETAILED DESCRIPTION

Explanation follows regarding a clip according to an exemplary embodiment, with reference to FIG. 1 to FIG. 6. Note that in FIG. 6, the arrow UP indicates the upward direction of a vehicle seat (seat) to which the clip is fixed, and IN indicates the width direction inside of the vehicle seat.

Figure 6:
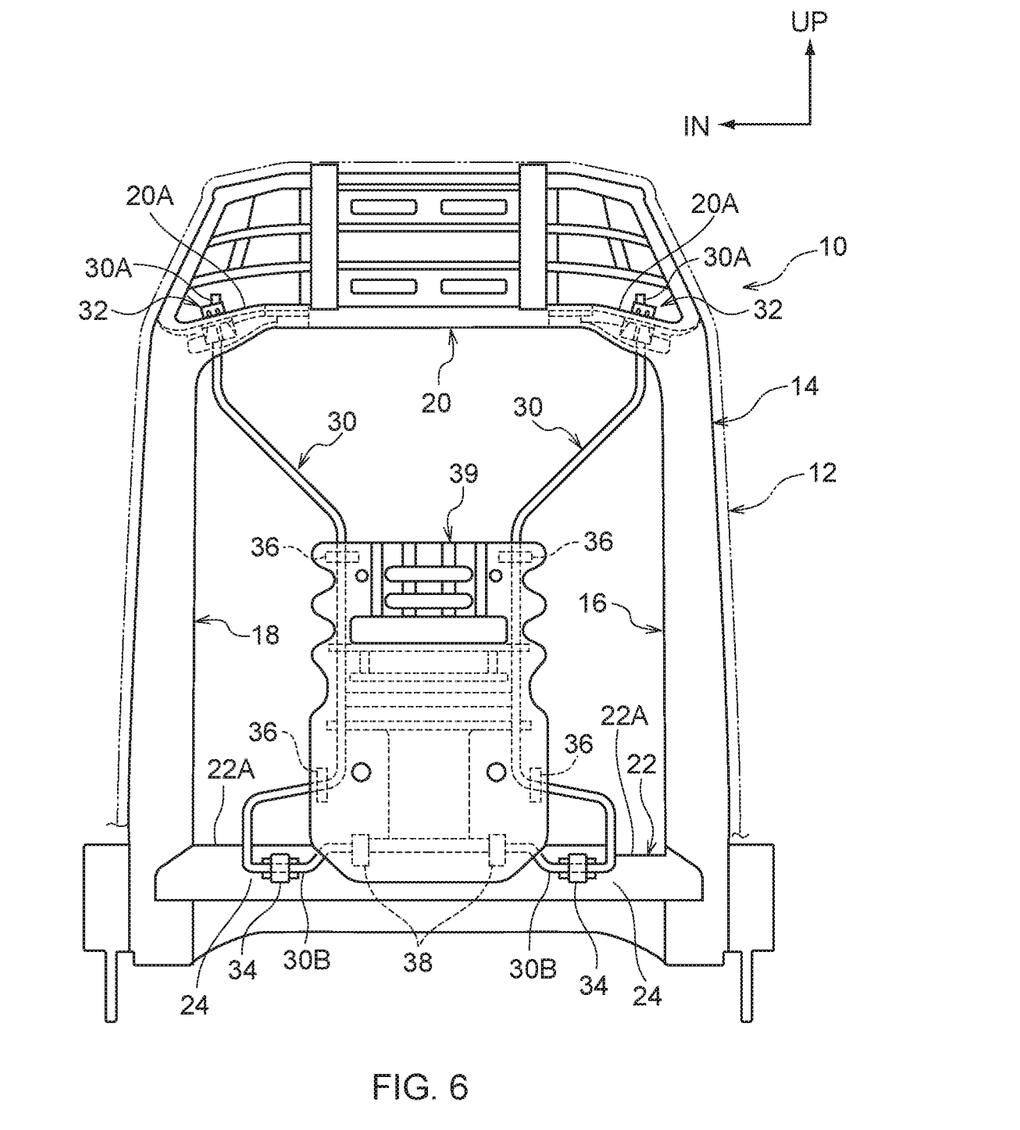
FIG. 6 is a schematic view illustrating a seatback frame applied with a clip according to an exemplary embodiment, as viewed from the vehicle front.

As illustrated in FIG. 6, a vehicle seat 10 of the present exemplary embodiment is provided with a seat cushion (not illustrated in the drawings) on which an occupant sits, and a seatback 12 that supports a back portion of the occupant sitting in the vehicle seat 10.

A seatback frame 14 configuring frame of the seatback 12 is provided at an inner portion of the seatback 12. The seatback frame 14 includes left and right side frames 16 and 18, an upper frame 20 spanning between upper ends of the left and right side frames 16 and 18, and a lower frame 22 spanning between lower ends of the left and right side frames 16 and 18.

A seatback spring 30 that is configured from a metal wire or the like and serves as a hard retained member (line-shaped member) is provided spanning among both end portions 20A of the upper frame 20 and both end portions 22A of the lower frame 22. Upper end portions 30A of the seatback spring 30 are attached to both end portions 20A of the upper frame 20 via grommets 32. Lower portions 30B of the seatback spring 30 are attached to both end portions 22A of the lower frame 22 via respective clips 34 of the present exemplary embodiment.

A seatback panel 37 is fixed to the seatback spring 30 via clips 35.

Clip Configuration

Figure 2:
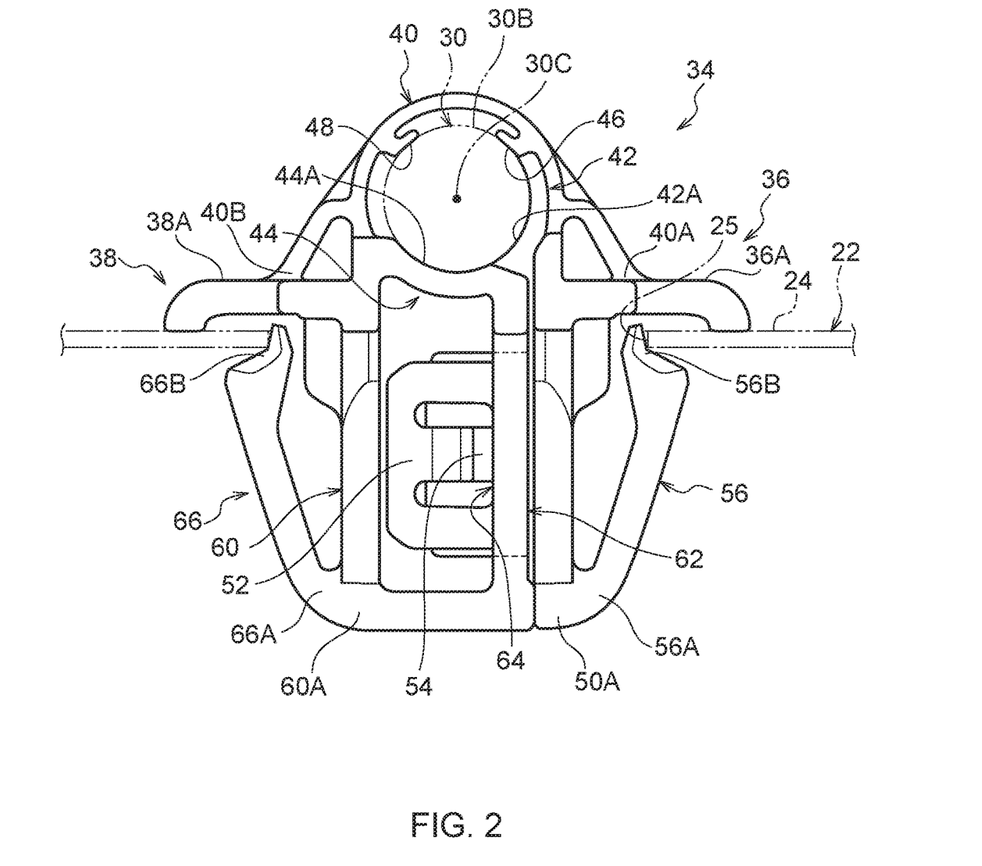
FIG. 2 is a front view corresponding to FIG. 1, illustrating an in-use state of a clip according to an exemplary embodiment.
Figure 3:
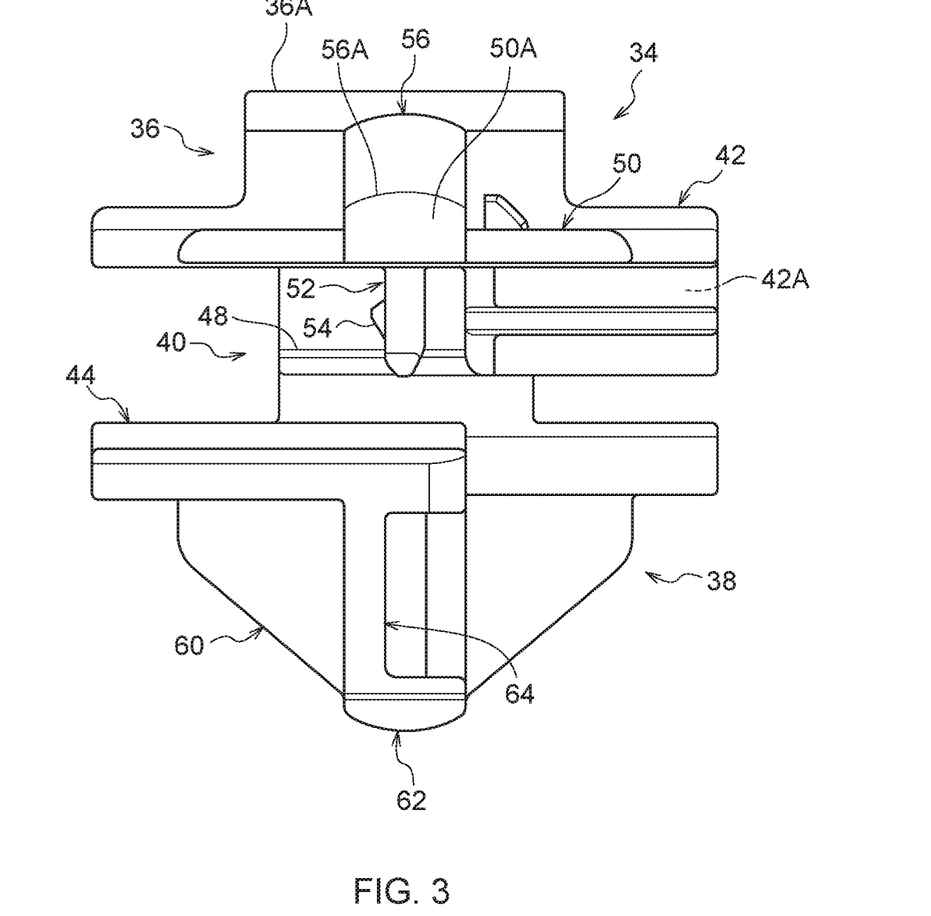
FIG. 3 is a side view, as viewed along the direction of arrow 3 in FIG. 1.
Figure 4:
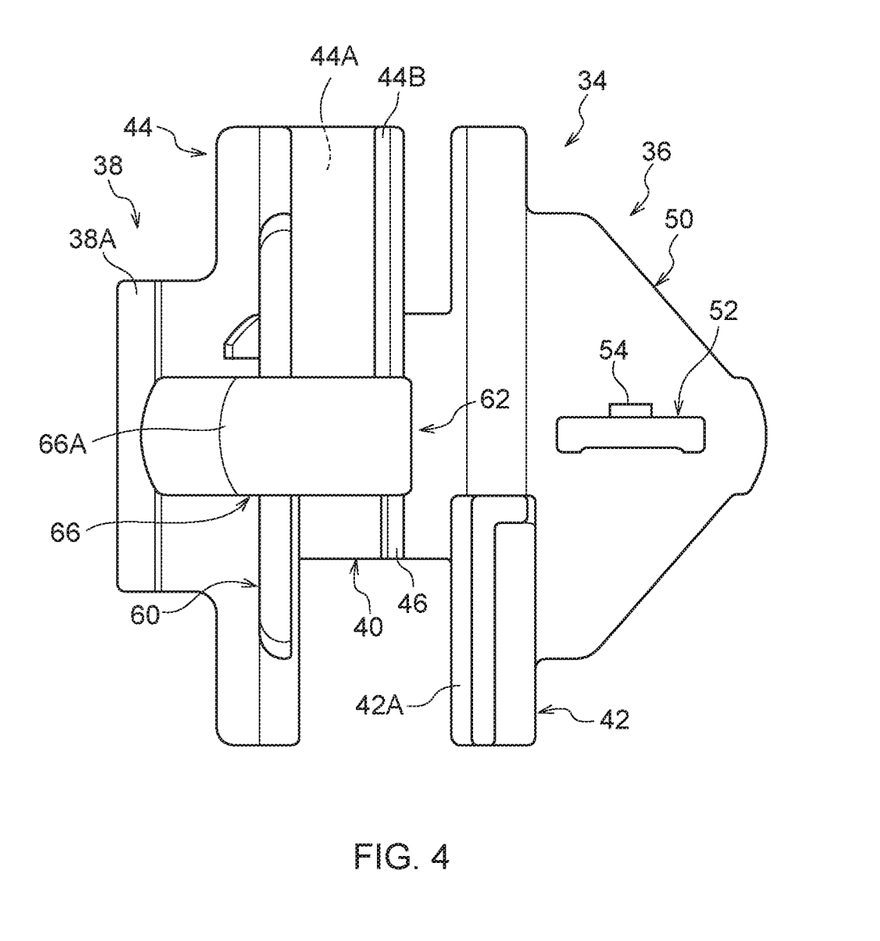
FIG. 4 is a plan view, as viewed along the direction of arrow 4 in FIG. 1.

As illustrated in FIG. 2, the clips 34 of the present exemplary embodiment are capable of attaching to circular shaped opening portions 25 (for example, through holes) formed (drilled or punched) at an attachment portion 24 of the lower frame 22 serving as an attached-to member. Note that as illustrated in FIG. 6, the attachment portion 24 of the lower frame 22 is configured by a vertical face running along the seat up-down direction.

Figure 1:
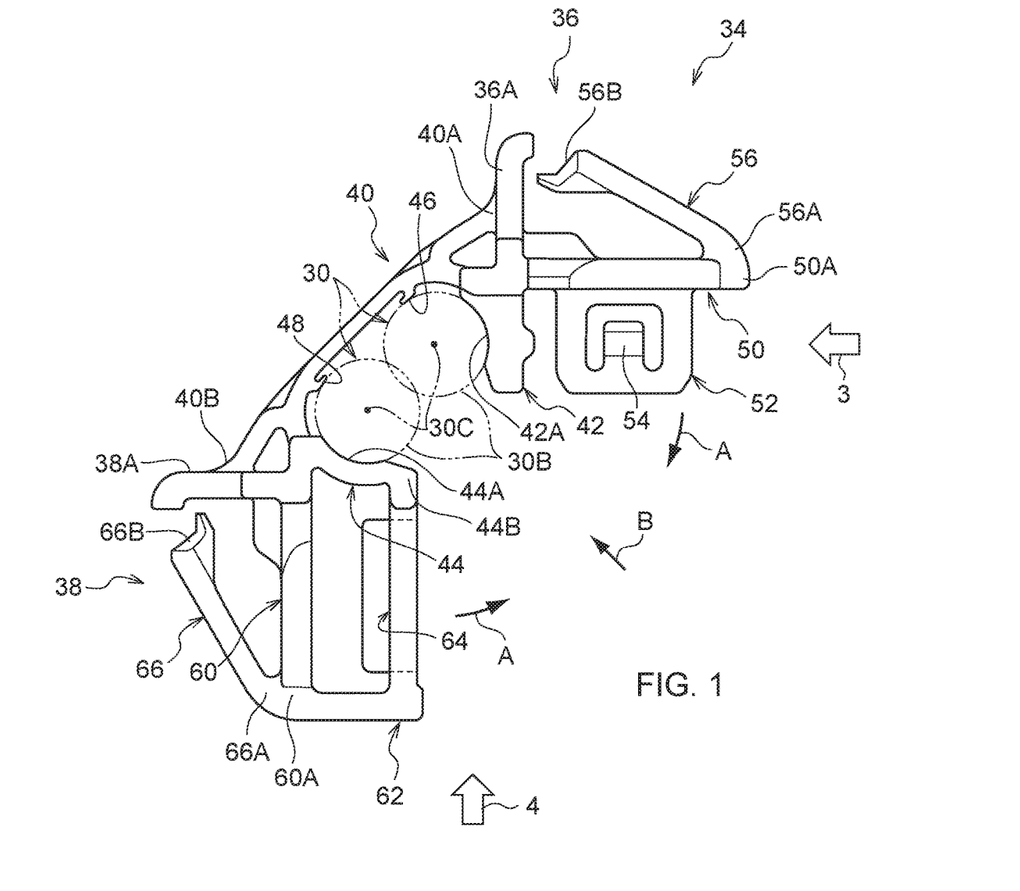
FIG. 1 is a front view of a clip according to an exemplary embodiment, as viewed along one axial line direction.

As illustrated in FIG. 1, each of the clips 34 includes a first attachment portion 36 that is insertable into the opening portion 25 (see FIG. 2), and a second attachment portion 38 that is insertable into the opening portion 25 in a state engaged with the first attachment portion 36 (the state in FIG. 2). The first attachment portion 36 and the second attachment portion 38 are coupled each other by a coupling portion 40.

The coupling portion 40 is strap (band) shaped, with one end portion 40A thereof coupled to a flange portion 36A of the first attachment portion 36, and another end portion 40B thereof coupled to a flange portion 38A of the second attachment portion 38. The coupling portion 40 couples the first attachment portion 36 and the second attachment portion 38 together in an open state in which the seatback spring 30 is able to pass between the first attachment portion 36 and the second attachment portion 38 in a radial direction of the seatback spring 30 (the arrow B direction in FIG. 1). Namely, as illustrated in FIG. 1, the coupling portion 40 couples the first attachment portion 36 and the second attachment portion 38 together in positions at which the first attachment portion 36 and the second attachment portion 38 are open at 90° (a right angle). The coupling portion 40 is capable of elasticity deformation, and couples the first attachment portion 36 and the second attachment portion 38 together such that they are capable of swinging in an engagement direction with respect to each other (the arrow A directions in FIG. 1).

A first placement portion 42, serving as a placement portion, is formed projecting out from the flange 36A of the first attachment portion 36 in a direction substantially facing the coupling portion 40 (below in FIG. 1). The first placement portion 42 substantially faces an inner peripheral face of the coupling portion 40, and a placement face 42A of the first placement portion 42 is formed as a circular arc shaped concave face corresponding to an outer peripheral face of the seatback spring 30. The seatback spring 30 can accordingly be placed on the placement face 42A with the placement face 42A in a state of the placement face 42A directing vertically upward.

A second placement portion 44, serving as a placement portion, is formed projecting out from the flange 38A of the second attachment portion 38 in a direction substantially facing the coupling portion 40 (on the right in FIG. 1). The second placement portion 44 substantially faces the inner peripheral face of the coupling portion 40, and a placement face 44A of the second placement portion 44 is formed as a circular arc shaped concave face corresponding to the outer peripheral face of the seatback spring 30. The seatback spring 30 can be accordingly placed on the placement face 44A with the placement face 44A in a state of the placement face 44A directing vertically upward (the state in FIG. 1).

As illustrated in FIG. 2, at intermediate portions in a length direction (a left-right direction intermediate portions in FIG. 2) of the coupling portion 40 at the inner peripheral face of the coupling portion 40, protrusions 46 and 48 are formed so as to project out, at a specific interval therebetween in the length direction of the coupling portion 40 (the left-right direction in FIG. 2). The protrusions 46 and 48 are configured so as to respectively abut the outer peripheral face of the seatback spring 30.

Figure 5:
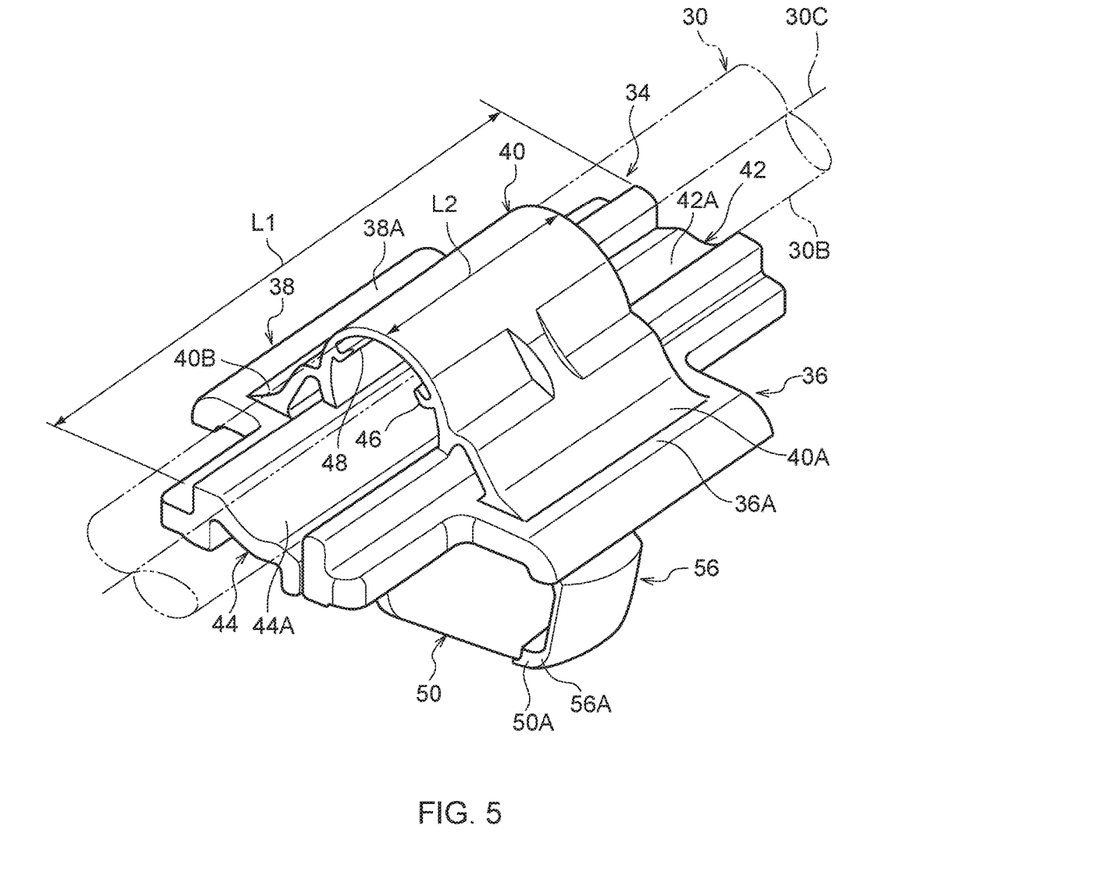
FIG. 5 is perspective view illustrating an in-use state of a clip according to an exemplary embodiment.

As illustrated in FIG. 5, in a mutually engaged state of the first attachment portion 36 and the second attachment portion 38, the first placement portion 42 and the second placement portion 44 attain a state coupled along a direction of an axial line 30C of the seatback spring 30. A length L1 of an overall placement portion, configured by coupling together the first placement portion 42 and the second placement portion 44, along the direction of the axial line 30C of the seatback spring 30 is longer than a length L2 of the coupling portion 40 along the direction of the axial line 30C of the seatback spring 30 (L1>L2).

As illustrated in FIG. 1, at a portion of the first attachment portion 36, where the flange portion 36A and the first placement portion 42 are coupled, a first insertion portion 50 is formed projecting out in a direction toward the opposite side to the coupling portion 40 (toward the right in FIG. 1), so as to be perpendicular to the flange portion 36A and the first placement portion 42. The first insertion portion 50 is formed with an engagement wall portion 52 projecting out toward an engagement direction (downward in FIG. 1). The engagement wall portion 52 is formed with an engagement claw 54, serving as an engagement portion.

A leading end 50A of the first insertion portion 50 is formed with an elastic leg portion 56 directing toward a direction on the opposite side to the engagement wall portion 52. The elastic leg portion 56 is capable of elastic deformation in a direction toward (approaching) and away from the first insertion portion 50, with a base portion 56A of the elastic leg portion 56 serving as a hinge portion. A leading end portion 56B of the elastic leg portion 56 is capable of elastically engaging with the opening portion 25 (see FIG. 2) of the attachment portion 24 of the lower frame 22.

At a portion of the second attachment portion 38, where the flange portion 38A and the second placement portion 44 are coupled, a second insertion portion 60 is formed projecting out in a direction toward the opposite side to the coupling portion 40 (downward in FIG. 1), so as to be perpendicular to the flange portion 38A and the second placement portion 44. The second insertion portion 60 is formed with an engaged-with protrusion portion 62 projecting out toward an engagement direction (the right in FIG. 1). The engaged-with protrusion portion 62 is formed with an engagement hole 64, serving as an engaged-with portion.

A leading end 60A of the second insertion portion 60 is formed with an elastic leg portion 66 directing toward a direction on the opposite side to the engaged-with protrusion portion 62. The elastic leg portion 66 is capable of elastic deformation in a direction toward (approaching) and away from the second insertion portion 60, with a base portion 66A of the elastic leg portion 66 serving as a hinge portion. A leading end portion 66B of the elastic leg portion 66 is capable of elastically engaging with the opening portion 25 (see FIG. 2) of the attachment portion 24 of the lower frame 22.

When the first attachment portion 36 and the second attachment portion 38 swing in mutually engaging directions (the arrow A directions in FIG. 1), the engagement claw 54 passes through the elastically deformed engagement hole 64, thereafter recovers such that the engagement claw 54 engages with a peripheral edge portion of the engagement hole 64, as illustrated in FIG. 2. The first placement portion 42, the second placement portion 44, and the coupling portion 40 hold (grip or nip) therebetween the seatback spring 30 in a locked state in which the first attachment portion 36 and the second attachment portion 38 are engaged with each other by the engagement claw 54 and the engagement hole 64.

Operation and Advantageous Effects

Next, explanation follows regarding operation of the present exemplary embodiment.

As illustrated in FIG. 1, in an unused state of the clip 34 of the present exemplary embodiment, the first attachment portion 36 and the second attachment portion 38 are coupled together by the coupling portion 40 in an open state (positions opened at 90°) in which the seatback spring 30 is able to pass in the radial direction of the seatback spring 30 (the arrow B direction in FIG. 1). In this state, the seatback spring 30 is placed between the coupling portion 40 and either the first placement portion 42 formed at the first attachment portion 36 or the second placement portion 44 formed at the second attachment portion 38.

Next, with the coupling portion 40 acting as a hinge, the first attachment portion 36 and the second attachment portion 38 are swung in the mutually engaging directions (the arrow A directions in FIG. 1), and as illustrated in FIG. 2, the engagement claw 54 formed at the first attachment portion 36 is made to engage with the peripheral edge portion of the engagement hole 64 formed at the second attachment portion 38. This thereby enables the seatback spring 30 to be held (griped or nipped) between the first placement portion 42, the second placement portion 44, and the coupling portion 40.

Next, in an engaged state, the first attachment portion 36 and the second attachment portion 38 are inserted into the circular opening portion 25 formed at the attachment portion 24 of the lower frame 22. When this is performed, the elastic leg portion 56 formed at the first attachment portion 36 and the elastic leg portion 66 formed at the second attachment portion 38 undergo elastic deformation and pass through the opening portion 25, and then recover such that the leading end portion 56B of the elastic leg portion 56 and the leading end portion 66B of the elastic leg portion 66 engage with the peripheral edge portion of the opening portion 25 of the lower frame 22. This thereby completes the attachment operation of the seatback spring 30 to the lower frame 22.

Accordingly, in the clip 34 of the present exemplary embodiment, in an operation to attach the seatback spring 30 to the attachment portion 24 of the lower frame 22, there is no need to push the first attachment portion 36 and the second attachment portion 38 apart in a direction away from each other (in the opposite directions to the arrow A directions in FIG. 1) in order to retain the seatback spring 30 in the clip 34. Moreover, when the first attachment portion 36 and the second attachment portion 38 are in the open state (the positions in FIG. 1) in which the seatback spring 30 is able to pass in the radial direction of the seatback spring 30 (the arrow B direction in FIG. 1), as illustrated by the double-dotted intermittent line in FIG. 1, the seatback spring 30 can be placed between the coupling portion 40 and either the first placement portion 42 or the second placement portion 44. This thereby improves the workability when attaching the seatback spring 30 to the lower frame 22.

In the clip 34 of the present exemplary embodiment, when retaining the seatback spring 30 in the clip 34, the seatback spring 30 can be placed between the coupling portion 40 and the placement portion that is easier to work with out of the first placement portion 42 formed at the first attachment portion 36 and the second placement portion 44 formed at the second attachment portion 38. This thereby further improves the workability when attaching the seatback spring 30 to the lower frame 22.

As illustrated in FIG. 5, in the clip 34 of the present exemplary embodiment, the length L1 of the overall placement portion, configured by coupling the first placement portion 42 and the second placement portion 44, along the direction of the axial line 30C of the seatback spring 30 is longer than the length L2 of the coupling portion 40 along the direction of the axial line 30C of the seatback spring 30 (L1>L2). Accordingly, when the seatback spring 30 is retained in the clip 34, the seatback spring 30 is supported by the first placement portion 42 and the second placement portion 44, whose axial direction length L1 is longer than the axial direction length L2 of the coupling portion 40. As a result, the seatback spring 30 can be retained in the clip 34 in a stable state, and the workability when attaching the seatback spring 30 to the lower frame 22 is further improved.

Note that it is possible that only one of the first placement portion 42 or the second placement portion 44 is formed as placement portion. For example, in a case in which only the first placement portion 42 is formed, it is possible that a length L1 of the the first placement portion 42, along the direction of the axial line 30C of the seatback spring 30 is longer than the length L2 of the coupling portion 40 along the direction of the axial line 30C of the seatback spring 30 (L1>L2)

In the clip 34 of the present exemplary embodiment, a clicking sensation can be obtained due to the engagement claw 54 formed at the first attachment portion 36 engaging with the peripheral edge portion of the engagement hole 64 formed at the second attachment portion 38. The engagement of the engagement claw 54 with the peripheral edge portion of the engagement hole 64 can accordingly be confirmed, thereby enabling engagement to be performed more reliably. Moreover, as illustrated in FIG. 2, the seatback spring 30 does not come apart from the clip 34 during the operation due to the engagement claw 54 engaging with the peripheral edge portion of the engagement hole 64 to attain a locked state. The workability when attaching the seatback spring 30 to the attachment portion 24 of the lower frame 22 is accordingly further improved.

Other Exemplary Embodiments

Detailed explanation has been given above regarding a specific exemplary embodiment; however the present invention is not limited to the above exemplary embodiment, and it would be clear to a person skilled in the art that various other exemplary embodiments are possible within the scope of the present invention. For example, in the exemplary embodiment described above, the clip 34 is applied to attachment of the seatback spring 30, serving as a retained member, to the lower frame 22, serving as an attached-to member. However, the retained member is not limited to the seatback spring 30, and configuration may be made with other retained members, such as a wire. Moreover, the attached-to member is not limited to the lower frame 22, and configuration may be made with other attached-to members, such as the upper frame 20.

In the clip 34 of the exemplary embodiment described above, the first attachment portion 36 and the second attachment portion 38 are coupled by the coupling portion 40 at a positions opened at 90°. However, there is no limitation to an angle of 90°, as long as the first attachment portion 36 and the second attachment portion 38 are open in a state in which the seatback spring 30 is able to pass therebetween in the radial direction of the seatback spring 30.

In the clip 34 of the exemplary embodiment described above, the first placement portion 42 is formed at the first attachment portion 36, and the second placement portion 44 is formed at the second attachment portion 38. Alternatively, configuration may be made in which a placement portion is formed to only one of the first attachment portion 36 or the second attachment portion 38.

In the clip 34 of the exemplary embodiment described above, the length L1 of the overall placement portion, configured by coupling the first placement portion 42 and the second placement portion 44, along the direction of the axial line 30C of the seatback spring 30 is longer than the length L2 of the coupling portion 40 along the direction of the axial line 30C of the seatback spring 30 (L1>L2). Alternatively, the length L1 of the overall placement portion along the direction of the axial line 30C of the seatback spring 30 and the length L2 of the coupling portion 40 along the direction of the axial line 30C of the seatback spring 30 may be the same length as each other (L1=L2). Moreover, the length L1 of the overall placement portion along the direction of the axial line 30C of the seatback spring 30 may be shorter than the length L2 of the coupling portion 40 along the direction of the axial line 30C of the seatback spring 30 (L1<L2).

In the clip 34 of the exemplary embodiment described above, the engagement portion is configured by the engagement claw 54, and the engaged-with portion is configured by the engagement hole 64; however the engagement portion and the engaged-with portion are not limited to the engagement claw 54 and the engagement hole 64, and other configurations may be employed.

The clip of the present invention can be applied to locations other than a vehicle seat.

What is claimed is:

1. A clip for retaining a single retained member comprising:
   a first attachment portion configured to be inserted into an opening portion formed at an attached-to member;
   a second attachment portion configured to be inserted into the opening portion of the attached-to-member in a state in which the first attachment portion and the second attachment portion are engaged by an engagement portion and engaged-with portion;
   a coupling portion that couples the first attachment portion and the second attachment portion such that the first attachment portion and the second attachment portion are configured to swing in mutually engaging directions;
   a first placement portion that is formed at the first attachment portion and a second placement portion that is formed at the second attachment portion, wherein the clip receives the single retained member between the coupling portion and the at least one of the first placement portion or the second placement portion;

the engagement portion formed at one of the first attachment portion or the second attachment portion; and the engaged-with portion formed at the other of the first attachment portion or the second attachment portion, and that is capable of engaging with the engagement portion;

wherein the clip has a naturally open state in which the single retained member can pass between the first attachment portion and the second attachment portion from a direction orthogonal to a longitudinal direction of the single retained member and be received between the coupling member and one of the first placement portion and the second placement portion without the first attachment portion and the second attachment portion having to be pulled apart in a direction away from each other, wherein the clip has an engaged state in which the first attachment portion and the second attachment portion are engaged with each other by the engagement portion and the engaged-with portion;

wherein in the clip's engaged state, the first placement portion and the second placement portion and the coupling portion abut the single retained member and grip there between the single retained member;

wherein in the clip's naturally open state, a dimension of a narrowest gap between the first attachment portion and the second attachment portion is larger than a width of the single retained member;

wherein a protrusion, positioned separate from the first placement portion and separate from the second placement portion, extends from a surface of the coupling portion and is defined at least in part by in an inner face, and in said clip's engaged state, the inner face of the protrusion abuts a first outer region of the single retained member and a first placement face portion of the first placement portion and a second placement face portion of the second placement portion abut the single retained member on a second outer region of the single retained member, wherein the first placement face portion and the second placement face portion are opposite and facing the inner face of the protrusion in a view along the longitudinal direction of the single retained member; and wherein in said clip's naturally open state without the first attachment portion and the second attachment portion engaged, the inner face of the protrusion abuts the first outer region of the single retained member and one of the first placement face portion of the first placement portion or the second placement face portion of the second placement portion simultaneously abuts the second outer region of the single retained member.

2. The clip of claim 1, wherein:
the single retained member is a line-shaped member; and
the clip further comprises elastic leg portions that are respectively formed at the first attachment portion and the second attachment portion, and that are capable of elastically engaging with a peripheral edge portion of the opening portion of the attached-to member.

3. The clip of claim 1, wherein a length of one of the first placement portion or the second placement portion along a direction of an axial line of the single retained member is longer than a length of the coupling portion along the direction of the axial line of the single retained member.

4. The clip of claim 2, wherein a length of one of the first placement portion or the second placement portion along a direction of an axial line of the single retained member is longer than a length of the coupling portion along the direction of the axial line of the single retained member.

5. The clip of claim 1, wherein the engagement portion is an engagement claw that is capable of elastic deformation, and the engaged-with portion is an engagement hole that the engagement claw is capable of engaging with.

6. The clip of claim 2, wherein the engagement portion is an engagement claw that is capable of elastic deformation, and the engaged-with portion is an engagement hole that the engagement claw is capable of engaging with.

7. The clip of claim 1, wherein in the clip's naturally open state, a dimension of a narrowest gap between the first placement portion of the first attachment portion and the second placement portion of the second attachment portion is set larger than the width of the retained member.

8. The clip of claim 1, wherein in the clip's engaged state, the engaged-with portion and the engagement portion are engaged and secured so as to be in locked state independent of insertion into the opening portion of the attached-to-member.

9. The clip of claim 8, wherein the engaged-with portion has an opening with a peripheral edge, the peripheral edge facing the other of the first attachment portion or the second attachment portion, and in the clip's engaged state the peripheral edge engages and secures the engagement portion in the locked state independent of insertion into the opening portion of the attached-to-member.

10. The clip of claim 9, wherein one of the engaged-with portion and the engagement portion is elastically deformed and recovered from a deformed state thereof.

11. The clip of claim 1, wherein in said clip's engaged state and in the view along the longitudinal direction of the single retained member,
an enclosed region in which the single retained member is retained is formed by a section of the clip, which section is continuous from the first placement portion via the coupling member to the second placement portion, and said width of the single retained member is substantially the same as an inner width of the enclosed region.

* * * * *